UNITED STATES PATENT OFFICE.

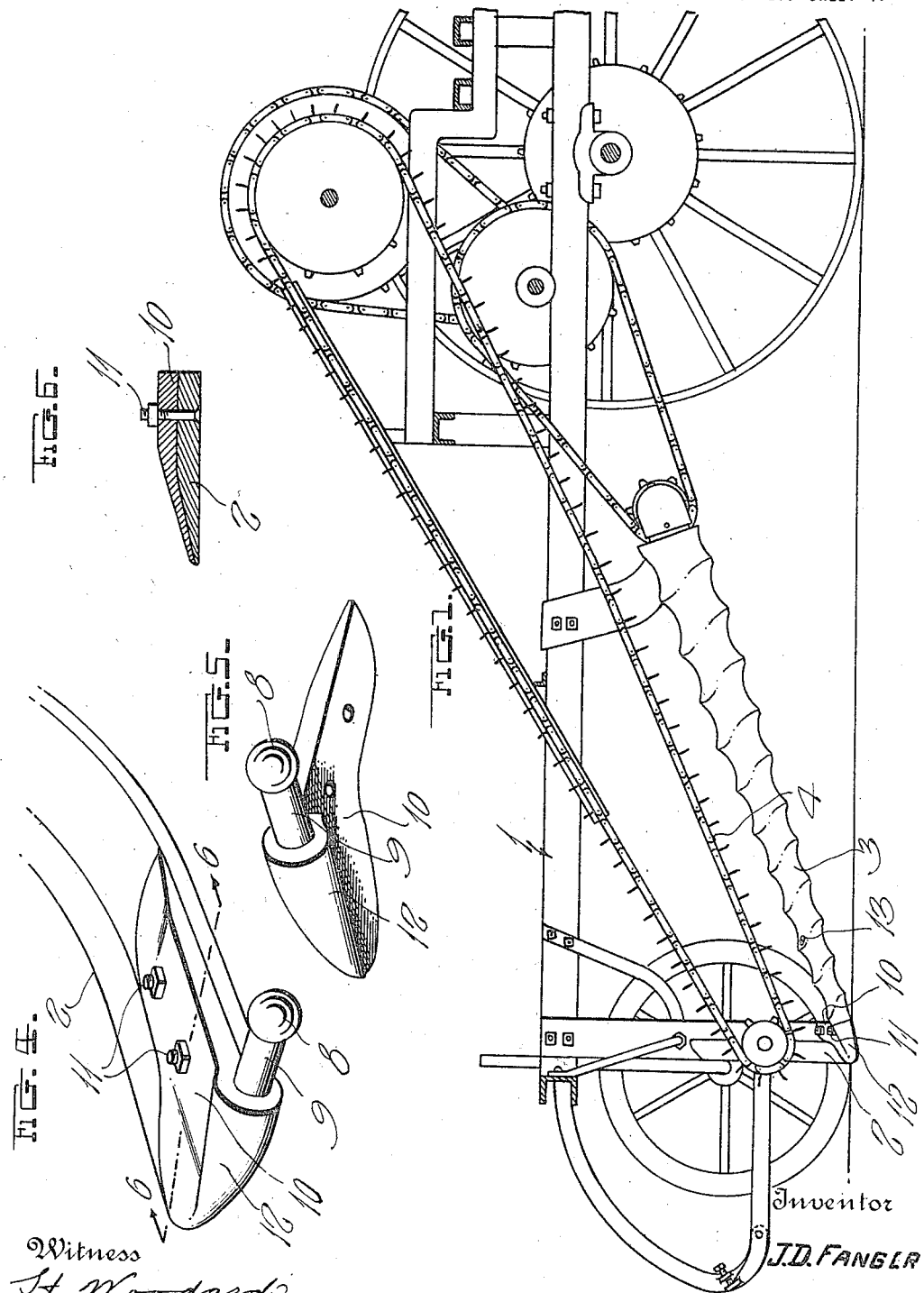

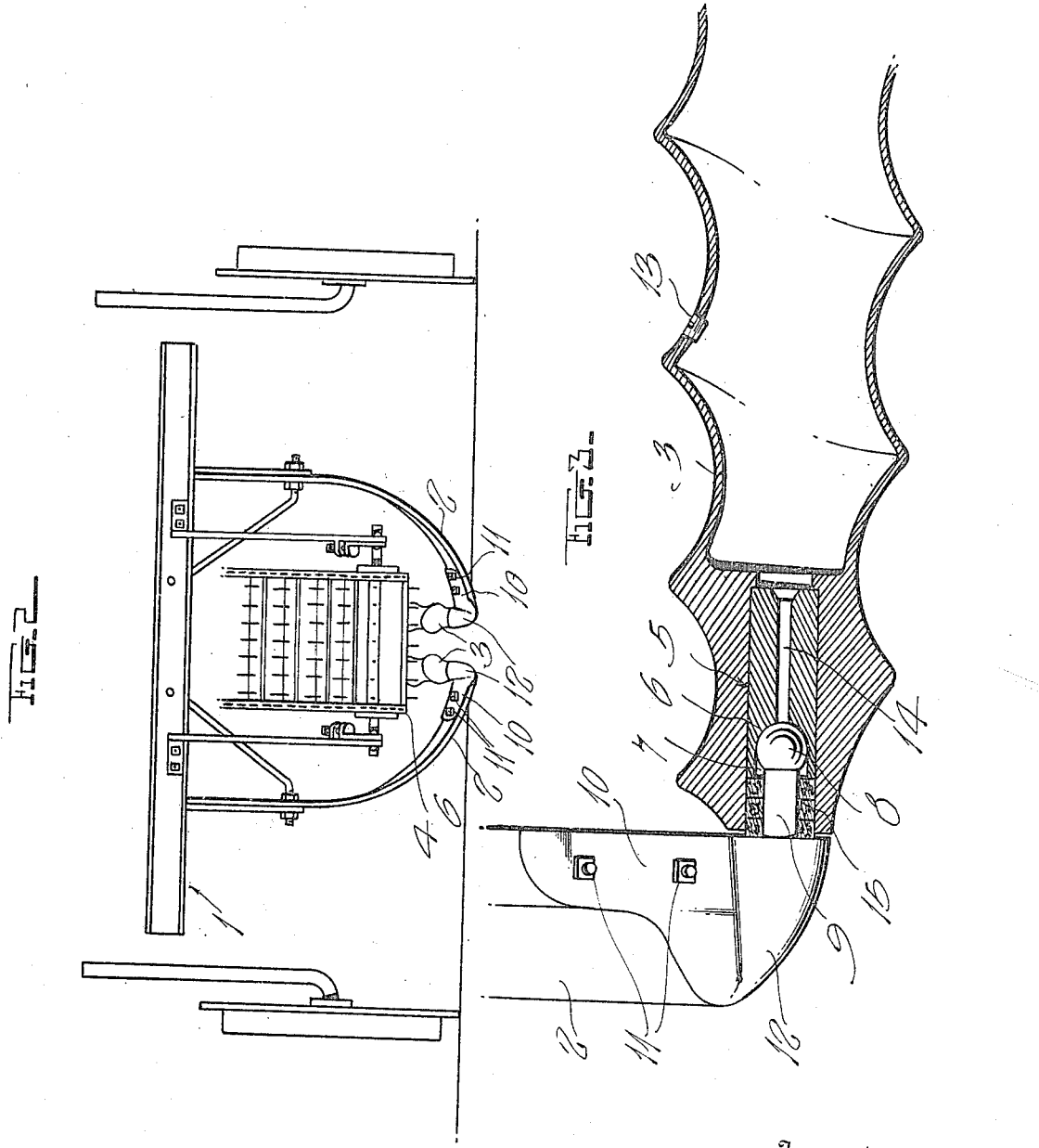

JOSEPH D. FANGER, OF TOLEDO, OHIO, ASSIGNOR TO THE FANGER BEET HARVESTER CO., OF TOLEDO, OHIO, A CORPORATION OF OHIO.

FRONT AUGER SUPPORT AND BEARING FOR BEET-HARVESTERS.

1,256,119.  Specification of Letters Patent.  Patented Feb. 12, 1918.

Application filed April 5, 1917. Serial No. 159,916.

*To all whom it may concern:*

Be it known that I, JOSEPH D. FANGER, a citizen of the United States, residing at Toledo, in the county of Lucas and State of Ohio, have invented certain new and useful Improvements in Front Auger Supports and Bearings for Beet-Harvesters; and I do declare the following to be a full, clear, and exact description of the invention, such as will enable others skilled in the art to which it appertains to make and use the same.

My invention relates to that class of beet harvesters shown in United States Patent 1,210,057, issued December 26, 1916. Several changes have been made in the construction of this machine over that originally contemplated and the machine as now manufactured is provided with means for adjusting the rear ends of the beet pulling augers toward and away from each other, this adjusting means constituting the subject matter of my copending application Serial No. 159,915, filed April 5, 1917. In connection with the adjusting means in question, it is essential to provide a simple and efficient front bearing for said augers which will permit of the necessary movement when said augers are being adjusted, this being the object of this invention.

With the foregoing general object in view, the invention resides in the novel features of construction, and the unique combinations of parts to be hereinafter fully described and claimed, the descriptive matter being supplemented by the accompanying drawings which form a part of this specification and in which:

Figure 1 is a longitudinal section of a beet harvesting machine showing the improved supporting means for the front ends of the augers, substantially all features which do not coöperate with the invention being omitted;

Fig. 2 is a front elevation of Fig. 1;

Fig. 3 is a horizontal section of one of the augers and a top plan view of the bearing ball and its attaching means;

Fig. 4 is a perspective view showing said bearing ball and the attaching means thereof applied;

Fig. 5 is a perspective view of the parts featured in Fig. 4 detached from the machine;

Fig. 6 is a detail section on the plane of the line 6—6 of Fig. 4.

In the drawings above briefly described, the numeral 1 has reference to a portable wheel-supported frame from whose front end a pair of earth slitting blades 2 depend, said blades being curved inwardly at their lower ends and sharpened on their front edges. Two longitudinally extending inclined augers 3 are carried by the machine and coöperate with a pronged chain 4 in pulling the beets from the earth and conveying them rearwardly after said earth has been slit on opposite sides of the row by the blades 2.

The front ends of the augers 3 are formed with longitudinal bores 5 into which cylindrical bearing members 6 are inserted and held against rotation in any preferred manner, the front ends of said members having sockets 7 whose inner ends are hemispherical as shown clearly in Fig. 3, said sockets receiving therein bearing balls 8 which are formed integrally with the rear ends of longitudinal necks 9 which are in turn integrally joined to attaching plates or shoes 10, the latter being secured by rivets or the like 11 to the lower ends of the blades 2 and being by preference formed with cone-shaped inner ends 12 from the larger ends of which the necks 9 extend. The front edges of the plates 10 are preferably sharpened to facilitate their passage through the earth and although said edges may be of any suitable configuration, they are preferably shaped as shown.

The augers 3 are of hollow construction and by the removal of plugs or the like 13, said augers may be partially filled with oil which is adapted to run through longitudinal ports 14 in the members 6 to lubricate the balls 8 and sockets 7 the leakage of oil from the lower ends of the augers and the entrance of dust into the bearings being prevented by suitable packings 15 which surround the necks 9 and contact with the walls of the bores 5 between the front ends of the bearing members 6 and the plates 10.

By constructing the improved bearing in the manner shown and described, it will be highly efficient and will permit either the front or the rear ends of the augers to be adjusted as occasion may demand. The invention is highly advantageous yet is simple and inexpensive. The particular construction shown and described constitutes the preferred form of the auger supporting and bearing means, but it is to be understood that within the scope of the invention as claimed, numerous changes may be made without sacrificing the principal advantages.

I claim:—

1. In a beet harvesting machine, the combination of a pair of beet pulling and conveying augers having sockets in their front ends, a pair of earth slitting blades located in advance of said augers, necks extending rearwardly from the lower ends of said blades and having bearing balls on their rear ends, said balls and necks being received in said sockets, and packing means in said sockets and surrounding said necks to prevent the entrance of dust and grit.

2. In a beet harvesting machine, the combination of a pair of longitudinally extending beet pulling and conveying augers having sockets in their front ends, earth slitting blades in advance of said augers and having their lower ends curved inwardly, shoes secured to the lower extremities of said blades and having integral necks extending rearwardly into said sockets and formed on their rear ends with bearing balls located in said sockets, and packing means in the open ends of said sockets and surrounding said necks to prevent the entrance of dust and grit.

3. In a beet harvesting machine, the combination of a pair of longitudinally disposed beet pulling and conveying augers of hollow formation and having sockets in their front ends in communication with the interior of said augers by means of oil passages, a pair of earth slitting blades in advance of said augers, necks extending rearwardly from the lower ends of said blades and having bearing balls on their rear ends received in said sockets, and packing means in the open front ends of said sockets and surrounding said necks to prevent the leakage of oil and the entrance of dust and grit.

In testimony whereof I have hereunto set my hand in the presence of two subscribing witnesses.

JOSEPH D. FANGER.

Witnesses:
HARRY LEVISON,
MARY SKEFFINGTON.

Copies of this patent may be obtained for five cents each, by addressing the "Commissioner of Patents. Washington, D. C."